(12) United States Patent
Ohishi et al.

(10) Patent No.: US 8,094,330 B2
(45) Date of Patent: Jan. 10, 2012

(54) IMAGE FORMING APPARATUS THAT CAN LAUNCH EXTERNAL APPLICATIONS SELECTIVELY AFTER SHIPMENT OF THE APPARATUS

(75) Inventors: Tsutomu Ohishi, Fukuoka (JP); Kohji Shimizu, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1165 days.

(21) Appl. No.: 10/621,448

(22) Filed: Jul. 18, 2003

(65) Prior Publication Data
US 2004/0057074 A1    Mar. 25, 2004

(30) Foreign Application Priority Data

Jul. 22, 2002  (JP) ................................ 2002-213009
Jul. 10, 2003  (JP) ................................ 2003-195192

(51) Int. Cl.
  *G06F 3/12*     (2006.01)
  *G06F 15/16*    (2006.01)
(52) U.S. Cl. ...................... 358/1.15; 358/1.12; 358/1.13; 358/1.14; 358/1.17; 358/1.18; 358/1.9; 358/501; 358/524; 358/426.01; 358/426.08; 358/426.09; 715/205; 715/223; 715/234; 715/255; 715/709; 715/716; 715/721; 715/733; 715/764; 715/769; 715/771; 715/779; 715/786; 715/804; 715/810; 709/203; 709/209; 709/218; 709/225; 709/232; 709/224; 709/246; 710/8; 710/36; 710/64; 710/72

(58) Field of Classification Search .................. 358/1.9, 358/1.15, 2.1, 500, 501, 504, 401, 404, 444, 358/1.16, 1.14, 1.12, 1.17, 1.18, 524, 426.08, 358/426.01, 426.09; 382/305; 709/209, 709/211, 224, 226, 3, 218, 203, 225, 232; 346/22, 24, 27, 54, 55, 79, 95; 399/66, 101, 399/121
See application file for complete search history.

(56) References Cited

U.S. PATENT DOCUMENTS
5,537,157 A * 7/1996 Washino et al. .............. 348/722
(Continued)

FOREIGN PATENT DOCUMENTS
EP         0 592 079        4/1994
(Continued)

OTHER PUBLICATIONS

U.S. Appl. No. 11/495,569, filed Jul. 31, 2006, Ohishi.

(Continued)

*Primary Examiner* — Steven Kau
(74) *Attorney, Agent, or Firm* — Oblon, Spivak, McClelland, Maier & Neustadt, L.L.P.

(57) ABSTRACT

An image forming apparatus is provided, in which the image forming apparatus includes service modules for performing system side processes on image formation, wherein applications can be added to the image forming apparatus separately from the service modules, and the image forming apparatus includes an application launch part for referring to launch selection information indicating at least a location that stores one or more applications, and launching the one or more applications from the at least a location according to the launch selection information.

17 Claims, 15 Drawing Sheets

U.S. PATENT DOCUMENTS

| | | | |
|---|---|---|---|
| 6,161,102 A * | 12/2000 | Yanagihara et al. | 707/3 |
| 6,226,097 B1 * | 5/2001 | Kimura | 358/1.14 |
| 6,330,611 B1 * | 12/2001 | Itoh et al. | 709/229 |
| 6,618,162 B1 * | 9/2003 | Wiklof et al. | 358/1.15 |
| 6,691,187 B1 * | 2/2004 | Schwerin | 710/62 |
| 6,697,847 B2 * | 2/2004 | Iwata | 709/218 |
| 7,130,881 B2 * | 10/2006 | Volkov et al. | 709/203 |
| 7,693,961 B2 * | 4/2010 | Nomura et al. | 709/219 |
| 2002/0054326 A1 * | 5/2002 | Morita | 358/1.15 |
| 2002/0054397 A1 * | 5/2002 | Matsushima | 358/524 |
| 2002/0144257 A1 * | 10/2002 | Matsushima | 717/178 |
| 2002/0149791 A1 * | 10/2002 | Ozawa et al. | 358/1.16 |

FOREIGN PATENT DOCUMENTS

| | | |
|---|---|---|
| EP | 0 699 995 | 3/1996 |
| EP | 0 816 972 | 1/1998 |
| EP | 0 845 714 | 6/1998 |
| JP | 6-237321 | 8/1994 |
| JP | 7-6028 | 1/1995 |
| JP | 7-13753 | 1/1995 |
| JP | 7-175548 | 7/1995 |
| JP | 8-339302 | 12/1996 |
| JP | 11-353048 | 12/1999 |
| JP | 2000-305761 | 11/2000 |
| JP | 2001-92552 | 4/2001 |
| JP | 2002-23573 | 1/2002 |
| JP | 2002-82806 | 3/2002 |
| JP | 2002-196933 | 7/2002 |
| JP | 2002-200827 | 7/2002 |
| JP | 2002-297403 | 10/2002 |

OTHER PUBLICATIONS

U.S. Appl. No. 11/372,073, filed Mar. 10, 2006, Shimizu, et al.
U.S. Appl. No. 11/248,288, filed Oct. 13, 2005, Ohishi.
U.S. Appl. No. 11/216,013, filed Sep. 1, 2005, Ando et al.
U.S. Appl. No. 10/798,437, filed Mar. 12, 2004, Tanaka et al.
U.S. Appl. No. 10/195,390, filed Jul. 16, 2002, Ohishi.
U.S. Appl. No. 10/274,882, filed Oct. 22, 2002, Akiyoshi.
U.S. Appl. No. 10/327,938, filed Dec. 26, 2002, Ohishi et al.
U.S. Appl. No. 10/334,828, filed Jan. 2, 2003, Ohishi et al.
U.S. Appl. No. 10/422,759, filed Apr. 25, 2003, Ohishi et al.
U.S. Appl. No. 10/900,098, filed Jul. 28, 2004, Ohishi et al.
Naoko Ogawa, "Understanding Intel Solaris"; Sun World; IDG Japan Company; vol. 11 No. 8; Aug. 1, 2001; 14 pages; (with English Translation).
Japanese Office Action issued Aug. 23, 2011, in Patent Application No. 2009-219713.
Japanese Office Action issued May 31, 2011, in Patent Application No. 2003-195192.

* cited by examiner

FIG.3

LAUNCH SETTING FILE

| PROGRAM NAME | xx.xxx.sample |
|---|---|
| PROGRAM NAME | yy.yy.test |
| ⋮ | |

FIG.4

APPLICATION DESCRIPTION FILE

| PROGRAM NAME | xx.xxx.sample |
|---|---|
| DISPLAY NAME | SAMPLE APPLICATION |
| VERSION | 1.0 |
| VENDOR NAME | ABC COMPANY |
| EXECUTION COMMAND | sample_apl -a 1 |
| INSTALL MEDIUM NUMBER | 1 |
| TOTAL NUMBER OF INSTALL MEDIUMS | 2 |
| TOTAL NUMBER OF INSTALLED INSTALL MEDIUMS | 1 |
| INSTALL DATE AND TIME | 2002.5.20 |
| LICENSE KEY | 1122-111-333 |

LAUNCH SELECTION DATA:     HDD/IC CARD (CAN SELECT EITHER OR BOTH)

EXTENSION SETTING DATA:     LAUNCH/NOT LAUNCH

EXTERNAL APPLICATION PRESENCE OR ABSENCE DATA :     PRESENT/ABSENT

FIG.10

EXTENSION SETTING DATA: LAUNCH/ NOT LAUNCH

AAA APPLICATION:LAUNCH/NOT LAUNCH

BBB APPLICATION:LAUNCH/NOT LAUNCH

CCC APPLICATION:LAUNCH/NOT LAUNCH

LAUNCH SETTING FILE

```
<http>
<PROGRAM NAME>http://www.xx.xxx.sample</PROGRAM NAME>
<PROGRAM NAME>http://www.yy.yy.test</PROGRAM NAME>
              ⋮
</http>
```

FIG.15

LAUNCH SELECTION DATA :
  HDD/IC CARD/http/ftp  (ONE OR MORE CAN BE SELECTED)

LAUNCH SETTING FILE ADDRESS(http)     http://www.xxxx.yyy.launch.conf

LAUNCH SETTING FILE ADDRESS(ftp)      ftp://ftp.xxxx.zzzz.launch.conf

IMAGE FORMING APPARATUS THAT CAN LAUNCH EXTERNAL APPLICATIONS SELECTIVELY AFTER SHIPMENT OF THE APPARATUS

BACKGROUND OF THE INVENTION

1. Field of the Invention

The present invention relates to technology for launching an external application that is installed separately from pre-installed applications in an image forming apparatus that provides user services on copying, printing, scanning, faxing and the like.

2. Description of the Related Art

Recently, an image forming apparatus (to be referred to as a compound machine hereinafter) that includes functions of a printer, a copier, a facsimile, a scanner and the like in a cabinet is generally known. The compound machine includes a display part, a printing part and an image pickup part and the like in a cabinet. In the compound machine, three pieces of software corresponding to the printer, copier and facsimile respectively are provided, so that the compound machine functions as the printer, the copier, and the facsimile respectively by switching the software.

Such a conventional compound machine on the market includes a mass storage such as a hard disk device (HDD). Although a hard disk device is used for storing an application program for a PC (Personal Computer), the hard disk device in the image forming apparatus is not used for storing an application program but is used mainly for storing image data since reliability of the hard disk device is low.

Therefore, according to the conventional compound machine, firmware including the application program is provided by embedding it in a nonvolatile memory such a flash memory when the compound machine is produced. Then, every application is launched from the nonvolatile memory.

Since the conventional compound machine is provided with each software for the printer, the copier, the scanner and the facsimile individually, much time is required for developing the software. Therefore, the applicant has developed an image forming apparatus (compound machine) including hardware resources, a plurality of applications, and a platform including various control services provided between the applications and the hardware resources. The hardware resources are used for image forming processes for a display part, a printing part and an image pickup part. The applications perform processes intrinsic for user services of printer, copier and facsimile and the like. The platform includes various control services performing system side processes such as management of hardware resources necessary for at least two applications commonly, execution control of the applications, and image forming processes.

According to such a new compound machine, the applications and the control services are provided separately, in which the control services perform complicated processes such as accessing hardware resources and the operating system. Thus, after the compound machine is shipped, users or third party venders can develop new applications to run on the compound machine. By doing so, various functions can be provided.

As to the new compound machine, it is necessary to install the external application into the compound machine after the compound machine is shipped separately from the existing applications, in which the existing applications relates to image forming processes such as copying, printing, scanning and faxing installed before the compound machine is shipped. In addition, it is necessary to launch the installed external applications.

However, it is generally difficult to embed the external application in the nonvolatile memory after the shipment of the compound machine. Therefore, it can be considered to use an IC card such as a flash card or a hard disk device as a storing area for the external application.

However, as to the new compound machine, for using the hard disk device or the IC card as the storing area for the external application, it is necessary to launch the external application from the hard disk device or the IC card. In addition, as to the new compound machine, the external application may be provided via a network.

In addition, as mentioned above, in the case where various mediums or areas such as the IC card, hard disk, an area in a network can be used as the storing area for the external application, there may be cases where all external applications can not be launched due to limitations of resources such as memory area of the compound machine. Thus, there may be a problem in that an external application can not be added in a customer side. This is a new problem that was not a problem for the conventional compound machine since the conventional compound machine does not assume installing the external application after shipment of the compound machine.

SUMMARY OF THE INVENTION

An object of the present invention is to provide an image forming apparatus that can launch external applications selectively even when the external applications are stored in various mediums and/or various areas.

The above-mentioned object is achieved by an image forming apparatus that includes service modules for performing system side processes on image formation, wherein applications can be added to the image forming apparatus separately from the service modules, the image forming apparatus including: an application launch part for referring to launch selection information indicating at least a location that stores one or more applications, and launching the one or more applications from the at least a location according to the launch selection information.

According to this invention, when applications are stored in various locations, the image forming apparatus can select one or more locations and launch applications from the one or more locations. Thus, an image forming apparatus that can provide various capabilities can be provided in which launch of applications can be performed selectively.

The above object is also achieved by a computer program for causing an image forming apparatus to launch an application, wherein image forming apparatus includes service modules for performing system side processes on image formation, and applications can be added to the image forming apparatus separately from the service modules, the computer program including: application launch program code means for referring to launch selection information indicating at least a location that stores one or more applications, and launching the one or more applications from the at least a location according to the launch selection information.

Also according to this program, the capability of selectively launching applications can be provided for the image forming apparatus.

BRIEF DESCRIPTION OF THE DRAWINGS

Other objects, features and advantages of the present invention will become more apparent from the following detailed description when read in conjunction with the accompanying drawings, in which:

FIG. 3 shows an example of information in a launch setting file according to the first embodiment;

FIG. 4 shows an example of an application description file according to the first embodiment;

FIG. 10 is an example of the information of the extension setting data of the compound machine of a second embodiment;

FIG. 14 shows an example of a launch setting file 1321 or 1341 according to the third embodiment;

FIG. 15 shows setting information of the launch selection data according to the third embodiment;

DETAILED DESCRIPTION OF THE PREFERRED EMBODIMENTS

In the following, an image forming apparatus of preferred embodiments will be described with reference to attached figures.

First Embodiment

Figure 1:
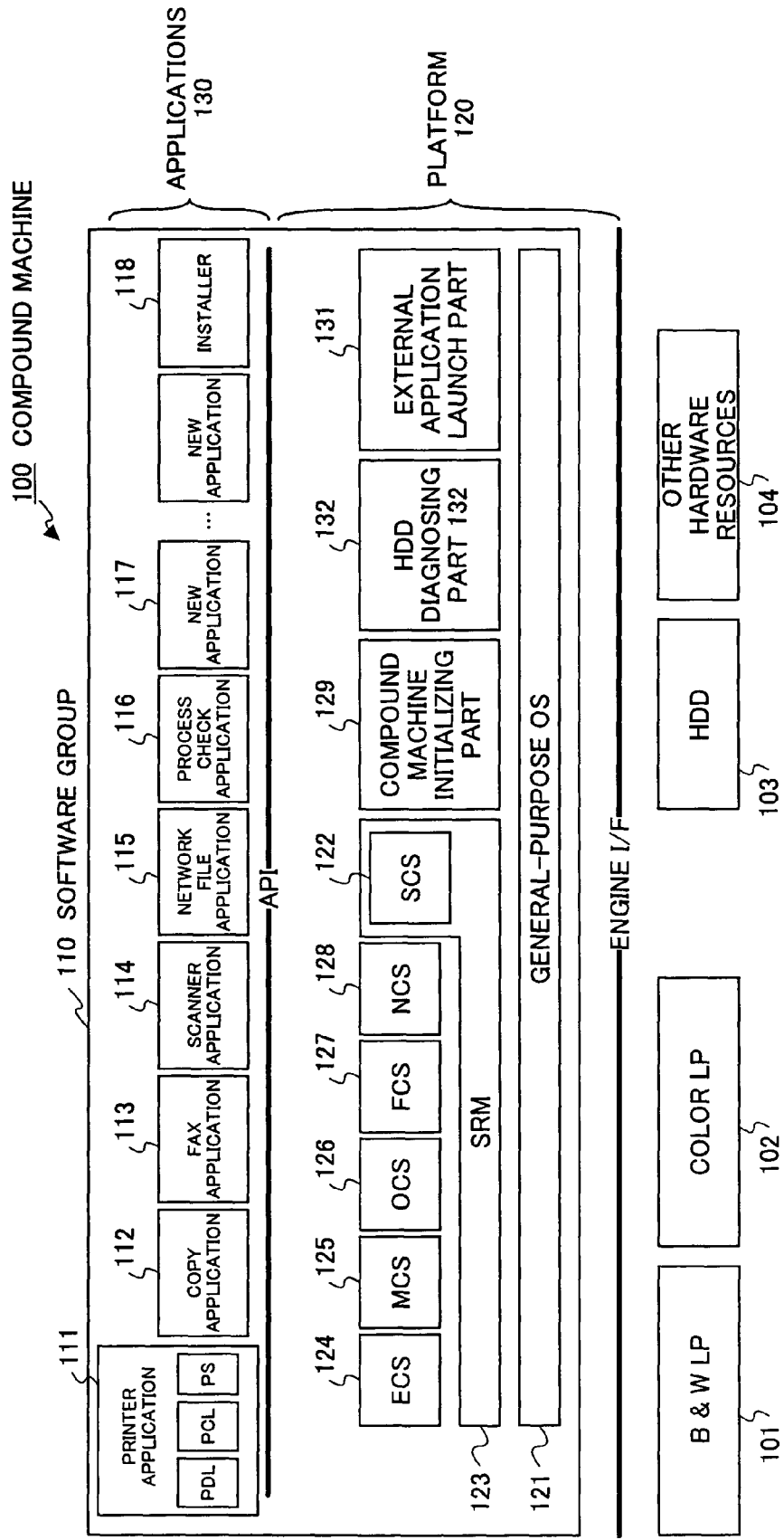
FIG. 1 is a block diagram of a compound machine according to a first embodiment.

FIG. 1 is a block diagram of an image forming apparatus (to be referred to as a compound machine hereinafter, the image forming apparatus can be also referred to as a composite machine, a multifunctional machine and the like) according to the first embodiment of the present invention. According to the compound machine, when an third party such as a customer or a third vendor develops an external application after the compound machine is shipped, the external application can be installed in a hard disk device (HDD) of the compound machine by using an installer of the compound machine. Then, after diagnosing the HDD, the external application can be launched from the HDD by using an external application launching part of the compound machine. In addition, according to the present embodiment, the external application can be stored in an IC card in an executable format, so that the application can be launched from the IC card by inserting the IC card into an IC card interface part of the compound machine. In addition, according to the compound machine of the present embodiment, the external application can be launched from either of the HDD and the IC card by selecting them.

As shown in FIG. 1, the compound machine 100 includes hardware resources and a software group 110. The hardware resources include a black and white line printer (B&W LP) 101, a color laser printer 102, and hardware resources 103 such as a scanner, a facsimile, a hard disk, memory (RAM, NV-RAM, ROM and the like) and a network interface. The software group 110 includes a platform 120, applications 130, a compound machine initializing part 129, a HDD diagnosing part 132, and an external application launch part 131.

The external application launch part 131 launches the external application 117 installed in the HDD 103 if the result of the diagnosis of the HDD 103 is normal. In addition, the external application launch part 131 launches the external application stored in a recording medium such as an IC card. Further, the external application launch part 131 selects between the HDD 103 and the IC card from one of which the external application is launched.

The compound machine initializing part 129 is a process that is launched first on the general OS 121, and launches control services, applications (excluding the external application 117), the HDD diagnosing part 132, and the external application launch part 131.

The HDD diagnosing part 132 diagnosing the HDD 103 for checking physical defects, consistency of file systems and the like. The HDD diagnosing part 132 sends the result of the diagnosis to the external application launch part 131 by using interprocess communication such as message sending.

The platform 120 includes control services for interpreting a process request from an application to issue an acquiring request for the hardware resources, a system resource manager (SRM) 123 for managing one or more hardware resources and arbitrating the acquiring requests from the control services, and a general-purpose OS 121.

The control services include a plurality of service modules, which are a system control service (SCS) 122, an engine control service (ECS) 124, a memory control service (MCS) 125, an operation panel control service (OCS) 126, a fax control service (FCS) 127, and a network control service (NCS) 128. Each control service has application program interfaces (API) that receive requests from the applications 130 and provide services to the applications. The API may be a function, an event or the like.

The general purpose OS 121 is a general purpose operating system such as the UNIX, and can execute each piece of software of the platform 120 and the applications 130 concurrently as a process.

The process of the SRM 123 is for performing, with the SCS 122, control of the system and performing management of resources. The process of the SRM 123 performs arbitration and execution control for requests from the upper layer that uses hardware resources including engines such as the scanner part and the printer part, a memory, a HDD file, a host I/Os (Centronics I/F, network I/F IEEE1394 I/F, RS232C I/F and the like).

More specifically, the SRM 123 determines whether the requested hardware resource is available (whether it is not used by another request), and, when the requested hardware resource is available, notifies the upper layer that the requested hardware resource is available. In addition, the SRM 123 performs scheduling for using hardware resources for the requests from the upper layer, and directly performs processes corresponding to the requests (for example, paper transfer and image forming by a printer engine, allocating memory area, file generation and the like).

The process of the SCS 122 performs application management, control of the operation part, display of system screen, LED display, resource management, and interrupt application control.

The process of the ECS 124 controls engines of hardware resources including the white and black laser printer (B&W LP) 101, the color laser printer (Color LP) 102, the scanner, and the facsimile and the like. The process of the MCS 125 obtains and releases an area of the image memory, uses the hard disk apparatus (HDD), and compresses and expands image data.

The process of the FCS 127 provides APIs for sending and receiving facsimile data from the application layer by using PSTN/ISDN network, registering/referring of various kinds of facsimile data managed by BKM (backup SRAM), facsimile reading, facsimile receiving and printing, and mixed sending and receiving.

The NCS 128 is a process for providing services commonly used for applications that need network I/O. The NCS 128 distributes data received from the network to a corresponding application, and acts as mediation between the application and the network when sending data to the network. More specifically, the process of the NCS 128 includes server daemon such as ftpd, httpd, lpd, snmpd, telnetd, smtpd, and client function of the protocol.

The process of the OCS 126 controls an operation panel that is a means for transferring information between the operator (user) and control parts of the compound machine. In the compound machine 100 of the embodiment, the OCS 126 includes an OCS process part and an OCS function library part. The OCS process part obtains an key event, which indicates that the key is pushed, from the operation panel, and sends a key event function corresponding to the key event to the SCS 122. The OCS function library registers drawing functions and other functions for controlling the operation panel, in which the drawing functions are used for outputting various images on the operation panel on the basis of a request from an application or from the control service. When the application is developed, functions in the OCS function library is linked to an object program that is generated by compiling a source code file of the application, so that an executable file of the application is generated. The OCS 126 can be operated as a process, or the OCS 126 can be configured as an OCS library.

The application 130 includes a printer application 111 that is an application for a printer having page description language (PDL) and PCL and post script (PS), a copy application 112, a fax application 113 that is an application for facsimile, a scanner application 114 that is an application for a scanner, a network file application 115 and a process check application 116.

Interprocess communication is performed between a process of the application 130 and a process of the control service, in which a function is called, a returned value is sent, and a message is sent and received. By using the interprocess communication, user services for image forming processes such as copying, printing, scanning, and sending facsimile are realized.

As mentioned above, the compound machine 100 of the first embodiment includes a plurality of applications 130 and a plurality of control services, and each of those operates as a process. In each process, one or more threads are generated and the threads are executed in parallel. The control services provide common services to the applications 130. User services on image formation such as copying, printing, scanning and sending facsimile are provided while the processes are executed in parallel, the threads are executed in parallel, and interprocess communication is performed. A third party vendor can develop an application 117 for the compound machine 100, and can executes the application in an application layer above the control service layer in the compound machine 100. FIG. 1 shows an example including the new application 117.

In the compound machine of the first embodiment, although processes of applications 130 and processes of control services operate, each of the application and the control service can be a single process. An application in the applications 130 can be added or deleted one by one.

The installer 118 is used for installing the external application 117 into the HDD 103. In the compound machine 100 of this embodiment, the external application 117 is stored in an IC card such as a flash card. The installer 118 installs the external application 117 into the HDD 103. The external application launch part 131 launches the external application 117 from the HDD 103, so that the external application operates on the application layer. On the other hand, preinstalled applications 130, control services, the HDD diagnosing part 132 and the external application launch part 131 are embedded in a flash memory before shipping, and are launched by the compound machine initializing part 129 when launching the compound machine 100 (at the time of power on).

Figure 2:
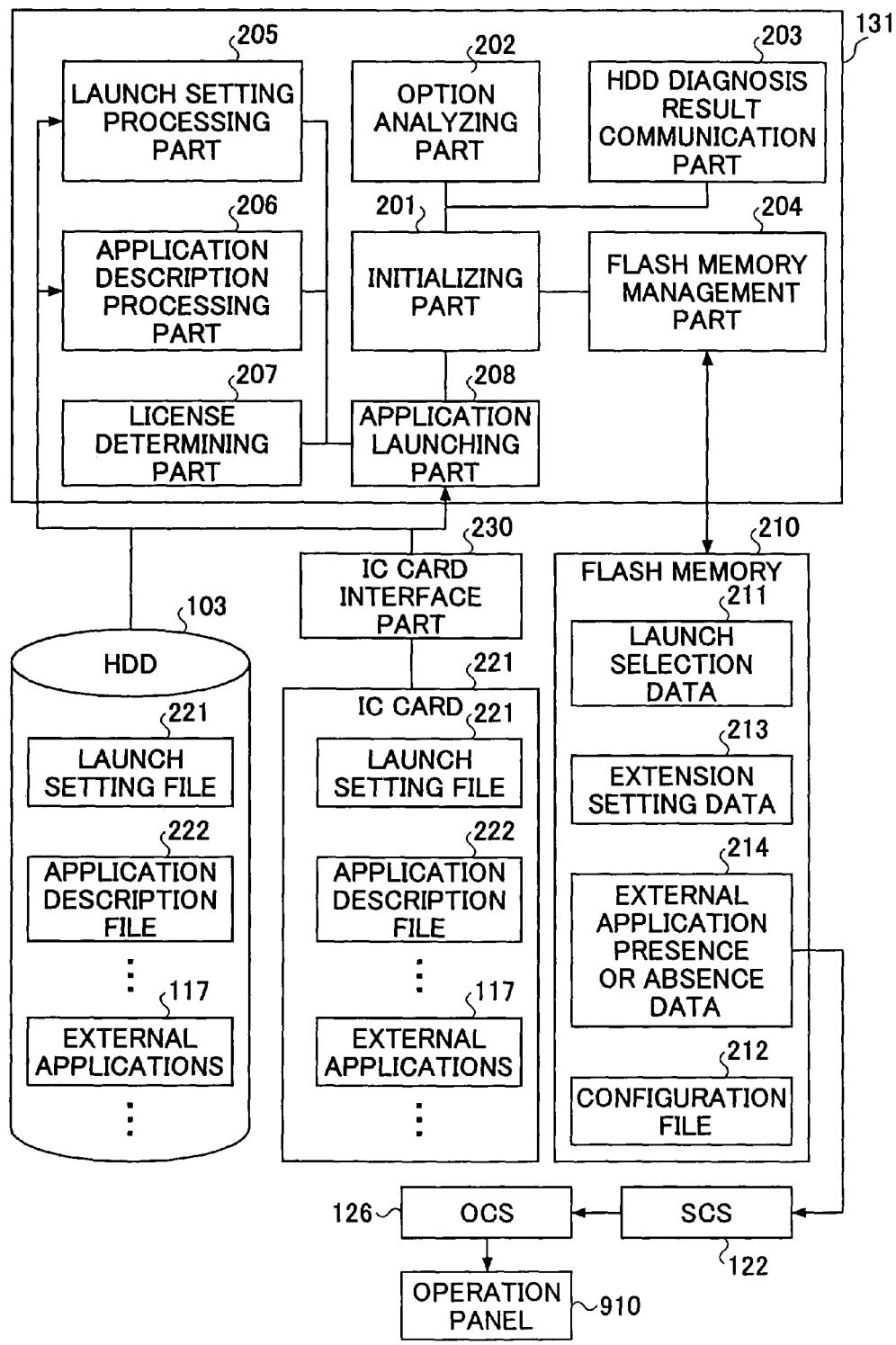
FIG. 2 is a block diagram showing functional configuration of an external application launching part of the compound machine of the first embodiment.

In the following, the configuration of the external application launch part 131 will be described. FIG. 2 is a block diagram showing functional configuration of the external application launching part of the compound machine 100 of the first embodiment. As shown in FIG. 2, the external application launch part 131 includes an initializing part 201, an option analyzing part 202, a HDD diagnosis result communication part 203, a flash memory management part 204, a launch setting processing part 205, an application description processing part 206, a license determining part 207 and an application launching part 208.

The HDD 103 includes one or more external applications 117, a launch setting file 221 in which data specifying one or more external applications to be launched from the HDD 103 is stored, and an application description file 222 in which various information of external applications is included.

Also, the IC card 240 includes one or more external applications 117, a launch setting file 221 in which data specifying external applications to be launched is stored, and an application description file 222 in which various information of external applications is included. The IC card 240 is a non-volatile recording medium such as an flash card for example. In addition, a SD (secure digital) card can be used as the IC card. Data input/output is performed through the IC card interface part 230. Although the launch setting file 221 and the application description file 222 are stored in a recording medium in which the external application is stored according to the present embodiment, the launch setting file 221 and the application description file 222 can be stored in other recording medium such as the flash memory 210 or other recording medium or a server connected to the compound machine via a network.

The flash memory 210 includes a launch selection data 211, an extension setting data 213 (also can be refereed to as an extension function setting data 213), an external application presence or absence data 214, and a configuration file 212. Although the above-mentioned data and files are stored in the flash memory 210 in this embodiment, the above-mentioned data and files can be stored in other nonvolatile memory.

The initializing part 201 initializes the external application launch part 131. The option analyzing part 202 analyzes option parameters of a command specified when the external application launch part 131 is launched by the compound machine initializing part 129.

The HDD diagnosing result communication part 203 waits for end of diagnosis of the HDD 103, and receives the result by using interprocess communication such as message sending. The HDD diagnosing result communication part 203 determines status of the HDD 103 according to the received diagnosis result.

The flash memory management part 204 reads data and/or files stored in the flash memory 210 and writes data and/or files in the flash memory 210. More specifically, the flash memory management part 204 reads the launch selection data 211, and determines a medium from which the external application is launched. The flash memory management part 204 reads the extension setting data 213 and determines whether an extension is used, the "extension" is a function provided by the external application 117 for the compound machine 100. The flash memory management part 204 writes the external application presence or absence data 214.

The launch setting processing part 205 reads the launch setting file 221 stored in the HDD 103 and/or the IC card 240, and analyses the file 221. In addition, the launch setting processing part 205 checks whether an program name is set in the launch setting file 221 so as to determine whether the external application 117 is installed. The application description processing part 206 reads the application description file 222 stored in the HDD 103, and analyses the application description file 222. The license determining part 207 determines validity of a license key in the application description file 222.

The application launching part 208 launches the external application stored in the HDD 103 or the IC card 240. At this time, the external application 117 is launched by issuing an execution command stored in the application description file 222.

Next, information in the launch setting file 221 stored in the HDD 103 or the IC card 240 will be described. The launch setting file 221 includes a list of program names of the external applications 117 installed in the HDD 103 or the IC card 240. For example, each time when the installer 118 installs an external application in the HDD 103, a program name of the external application is added in a format: "program name, program file name of the external application".

FIG. 3 shows an example of information in the launch setting file 221. As the program name of the external application, a program file name of a file system of the HDD 103 such as "xx.xxx.sample, yy.yy.test" is stored as shown in FIG. 3. The program name is unique in the compound machine 100.

Next, the application description file 222 stored in the HDD 103 or the IC card 240 will be described. The application description file 222 exists for each external application, and includes attribute information of the external application.

The application description file 222 is stored, with the external application, in a recording medium for installing. The application description file 222 is stored in the HDD 103 when the external application is installed in the HDD 103 from the recording medium for installing. Therefore, when a plurality of external applications are stored in the HDD 103, a plurality of application description file 222 exist for the applications.

FIG. 4 shows an example of the application description file 222. As shown in FIG. 4, the application description file 222 includes a program name, a display name, version, a vendor name, a execution command, an install medium number, a total number of install mediums, a total number of installed install mediums, install date and time, and a license key.

The items of the program name, display name, version, vendor name and execution command are set by the developer of the external application when the external application is installed in a recording medium for install. The program name indicates the program name of the external application. After the install, the program name becomes the program name in the launch setting file 221.

The display name is displayed on an display part of the operation panel when the external application is installed by the installer 118 or when the external application is launched by the external application launch part 131.

The version is a character string indicating version information of the external application, and is displayed on an display part of the operation panel when the external application is installed by the installer 118 or when the external application is launched by the external application launch part 131.

The vendor name is a character string indicating the vendor name that developed the external application, and is displayed on an display part of the operation panel when the external application is installed by the installer 118 or when the external application is launched by the external application launch part 131.

The execution command is a command for executing the external application 117, and is specified by using relative path. If necessary, command line option can be specified. This command is executed by the external application launch part 131.

When the external application is divided into a plurality of mediums for installing, the install medium number indicates a position of the medium. If the application is stored in one medium, 0 is set. The install medium number is displayed on a display part of the operation panel when the external application is installed by the installer 118 in to the HDD.

The total number of the install mediums is the total number. When the application is installed in one medium, 0 is set as the number. The total number of installed install mediums is a total number of installed install mediums.

The install date and time indicates date and time when the application was installed. The date and time is displayed in an user interface of the installer 118.

The license key indicates a license key of the external application. The license key is input by the user at the time of install of the application.

In the above-mentioned example, the launch setting file and the application description file are stored in the HDD when the external application is installed. However, each of the launch setting file and the application description file can be stored in any medium or apparatus by using a method different from the above-mentioned method.

Next, each data and file stored in the flash memory 210 will be described. The configuration file 212 indicates programs to be launched among control services and existing preinstalled applications such as the printer application 111 and copy application 112. The configuration file is referred to by the compound machine initializing part 129 when the compound machine is powered on.

Figures 5, 6:
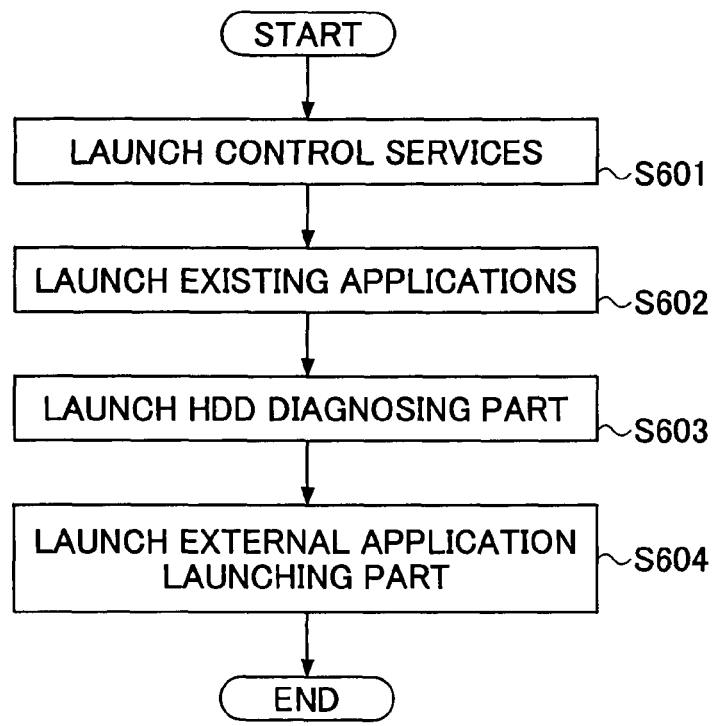
FIG. 5 shows setting information of launch selection data, extension setting data and external application presence or absence data according to the first embodiment.
FIG. 6 is a flowchart showing procedure of the initialization by the compound machine initializing part according to the first embodiment.

FIG. 5 shows setting information of the launch selection data 211, extension setting data 213 and external application presence or absence data 214. The launch selection data 211 indicates at least one stored location of the external application to be launched. That is, the launch selection data 211 indicates from which medium the external application is to be launched. As shown in FIG. 5, as the launch selection data 211, "HDD" or "IC card" can be set, in addition, a plurality of items can be set. That is, both of "HDD" and "IC card" can be set. The launch selection data 211 is set via a initial setting screen displayed on the operation panel 910 and is referred to by the external application launch part 131.

If "HDD" is set as the launch selection data 211, only an external application that is stored in the HDD 103 is launched. If "IC card" is set in the launch selection data 211, only an external application that is stored in the IC card 240 is launched. If "HDD and IC card" is set as the launch selection data 211, external applications stored in the HDD and the IC card are launched.

The extension setting data 213 indicates whether an extension of the compound machine 100 provided by the external application is used, that is, indicates whether the external application is to be launched or not. As shown in FIG. 5, "launch" or "not launch" is set as the extension setting data 213. The extension setting data 213 is set via the initial setting screen displayed on the operation panel 910, and is referred to by the external application launch part 131. When "launch" is set in the extension setting data 213, the external application is launched. When "not launch" is set in the extension setting data 213, the external application is not launched.

The external application presence or absence data 214 indicates information whether the external application is installed or not in the HDD 103 or the IC card 240. The external application presence or absence data 214 is set, for example, by the external application launch part 131, and is referred to by the SCS 122. When "presence" is set in the external application presence or absence data 214, items of extension setting are displayed on the initial setting screen by the SCS 122. When "absence" is set in the external application presence or absence data 214, items of extension setting are not displayed on the initial setting screen.

In the following, initialization of the compound machine 100 will be described. The initialization is performed before launch of the external application. FIG. 6 is a flowchart showing procedure of the initialization by the compound machine initializing part 129. When the compound machine 100 is powered on, a ROM monitor (not shown in the figure) initializes hardware resources and diagnoses a controller board. After that, the general OS 121 launches. Then, the ROM monitor launches the compound machine initializing part 129 on the general OS 121. The compound machine initializing part 129 is a process launched first in the general OS 121.

The compound machine initializing part 129 read the configuration file 212 from the flash memory 210, and launches control services according to information in the configuration file 212 in step S601. Next, according to the setting information of the configuration file 212, preinstalled existing applications are launched such as the printer application 111, the copy application 112, the scanner application 114, the fax application 113, the net file application 115 and the process check application 116 in step S602. Then, the HDD diagnosing part 132 is launched and diagnosis of the HDD 103 is performed in step S603. Then, checking of physical defect, checking of file systems and the like start. Next, the external application launch part 131 is launched in step S604.

Figure 7:
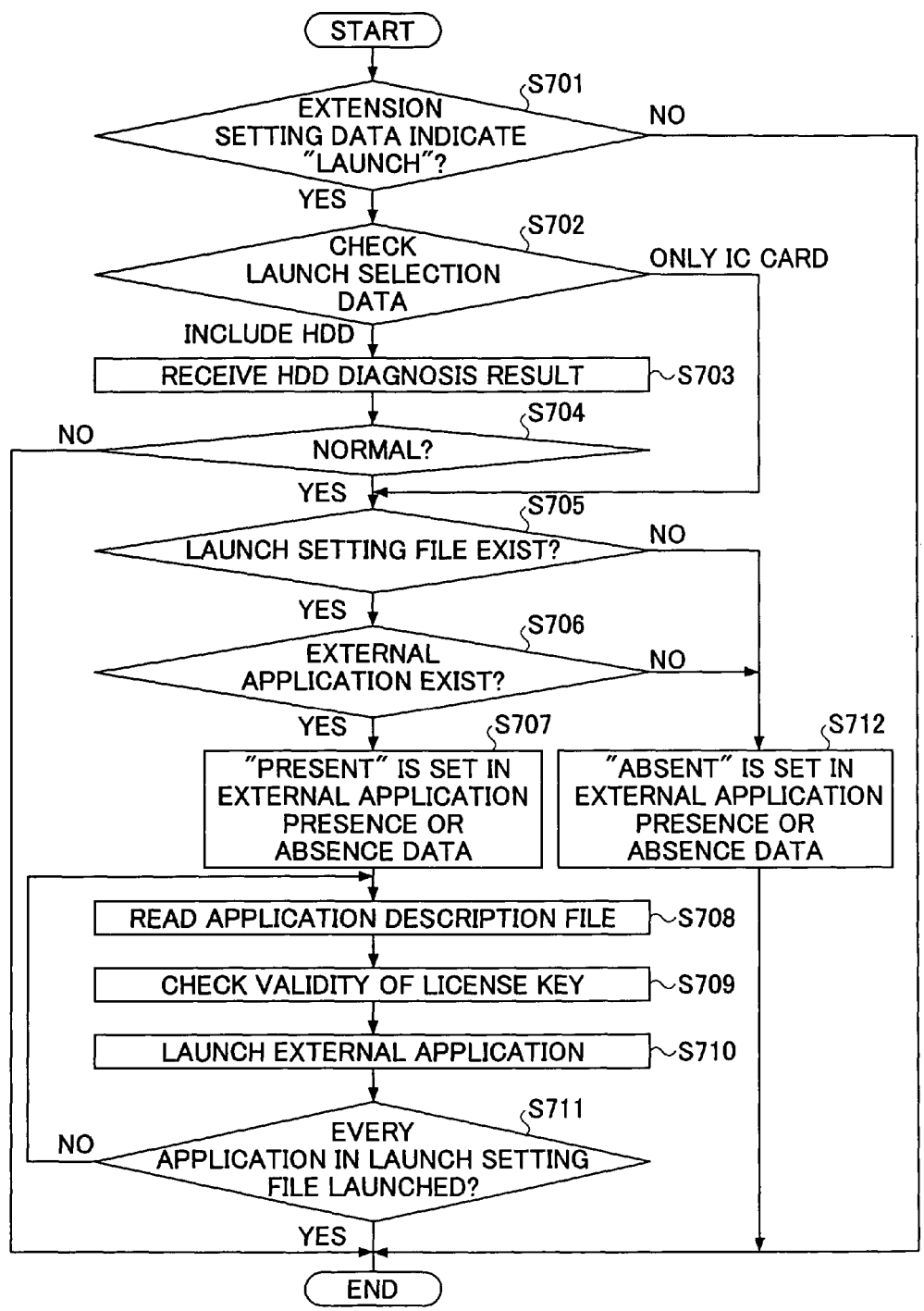
FIG. 7 is a flowchart showing the procedure for launching the external application according to the first embodiment.

Next, launching process of the external application performed by the external application launch part 131 will be described. FIG. 7 is a flowchart showing the procedure.

First, the external application launch part 131 reads extension setting data 213 from the flash memory 210, and checks whether the extension setting data 213 indicates "launch" in step S701. If the extension setting data 213 indicates "not launch" (No: step S701), the process ends without launching the external application.

If the extension setting data 213 indicates "launch" (Yes: step S701), the launch selection data 211 is read from the flash memory 210, and checks setting information of the launch selection data 211 to determine a medium or mediums from which the external application 117 is launched in step S702. When the information of the launch selection data 211 includes "HDD", that is, when the launch selection data 211 is "HDD" or "HDD and IC card", the external application launching part enters a wait state for diagnosing result by the HDD diagnosing part 132.

When the external application launching part receives the diagnosing result from the HDD diagnosing part 132 in step S703, the external application launch part 131 determines whether the result indicates normal or abnormal in step S704. If the result indicates abnormal (No: step S704), an error message is displayed on a display part of the operation panel 910 and the external application 117 is not launched.

When the result indicates normal (Yes: step S704), the external application launch part 131 checks whether the launch setting file 221 exists in a medium indicated by the launch selection data 211 in step S705.

That is, if the application is to be launched from the HDD 103 according to the setting of the launch selection data 211, the external application launch part 131 checks whether the launch setting file 221 exists in the HDD 103. If the external application is to be launched from the IC card 240 according to the setting of the launch selection data 211, the external application launch part 131 checks whether the launch setting file 221 exists in the IC card 240. In addition, when external applications are to be launched from both of the HDD 103 and the IC card 240, the external application launch part 131 checks whether the launch setting files exist in both of the HDD 103 and the IC card 240.

When the launch setting file 221 does not exists (No in step S705), the external application launch part 131 determines that the external application is not installed in the medium, so that "absence" is set in the external application presence or absence data 214 in step S712.

When the launch setting file 221 exists (Yes in step S705), the external application launch part 131 further checks whether the launch setting file 221 includes a program name of an external application in step S706. If the launch setting file 221 does not include the program name of the external application (No in step S706), the external application launch part 131 determines that the external application is not installed in the medium, so that the external application launch part 131 sets "absence" in the external application presence or absence data 214 in step S712.

If the launch setting file 221 includes the program name of the external application (Yes in step S706), the external application launch part 131 determines that the external application 117 is installed, so that "presence" is set in the external application presence or absence data 214 in step S707.

Next, the external application launch part 131 reads the application description file 222 of the external application 117 from the medium indicated by the launch selection data 211 in step S708. Then, the external application launch part 131 determines validity of the license key in the application description file 222 to determine whether the license key is expired, or abnormal or the like in step S709. At this time, if it is determined that the license key is invalid, the external application 117 is not launched, and an message indicating the license key is invalid is displayed on the operation panel 910.

When the license key is valid, the external application launch part 131 launches the external application from the medium indicated by the launch selection data 211 in step S710. Then, the processes from the step S708 to step S710 are repeated for every external application set in the launch setting file 221 in step S711. Accordingly, as shown in FIG. 2, all external applications that are installed in specified mediums are launched to be executed on the application layer.

In the above-mentioned procedure, instead of setting the external application presence or absence data 214 by the external application launch part 131, the external application presence or absence data 214 can be also set when storing an external application in a medium.

Figure 8:
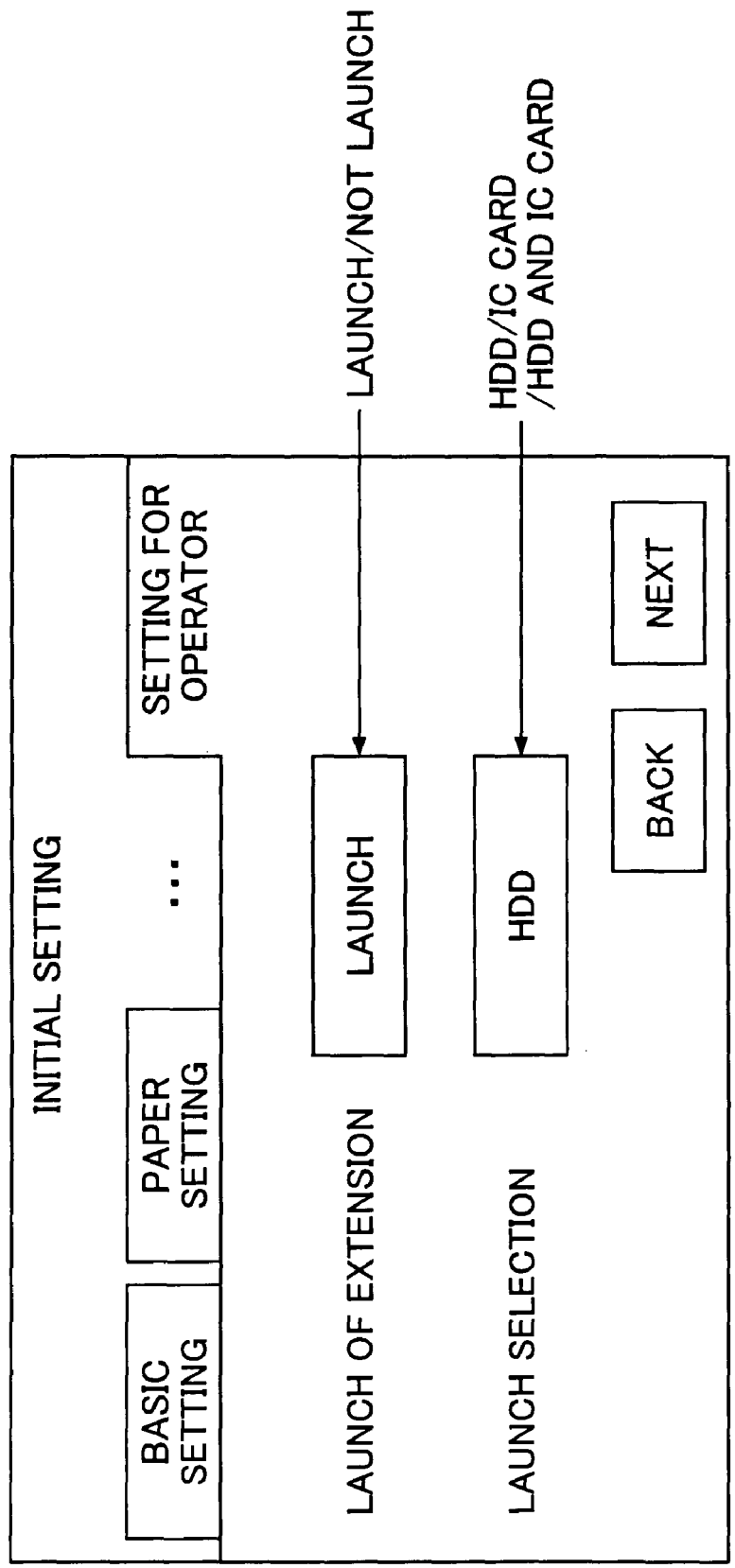
FIG. 8 shows an initial setting screen according to the first embodiment.

Information in the extension setting data and the launch selection data can be set from the operation panel 910 of the compound machine 100. FIG. 8 shows the initial setting screen. The initial setting screen is displayed by calling drawing functions of the function library of the OCS 126 by the SCS 122. At this time, as shown in FIG. 2, the SCS 122 refers to the external application presence or absence data 214 in the flash memory 210. When the external application presence or absence data 214 indicates "present", that is, when the external application is installed in a medium specified by the launch selection data 211, an item of "launch of extension" appears in the setting screen for operator in the initial setting screen as shown in FIG. 8. In the item of "launch of extension", "launch" or "not launch" can be selected. If "launch" is selected, "launch" is set in the extension setting data 213 by the SCS 122. If "not launch" is selected, "not launch" is set in the extension setting data 213.

Figure 9:
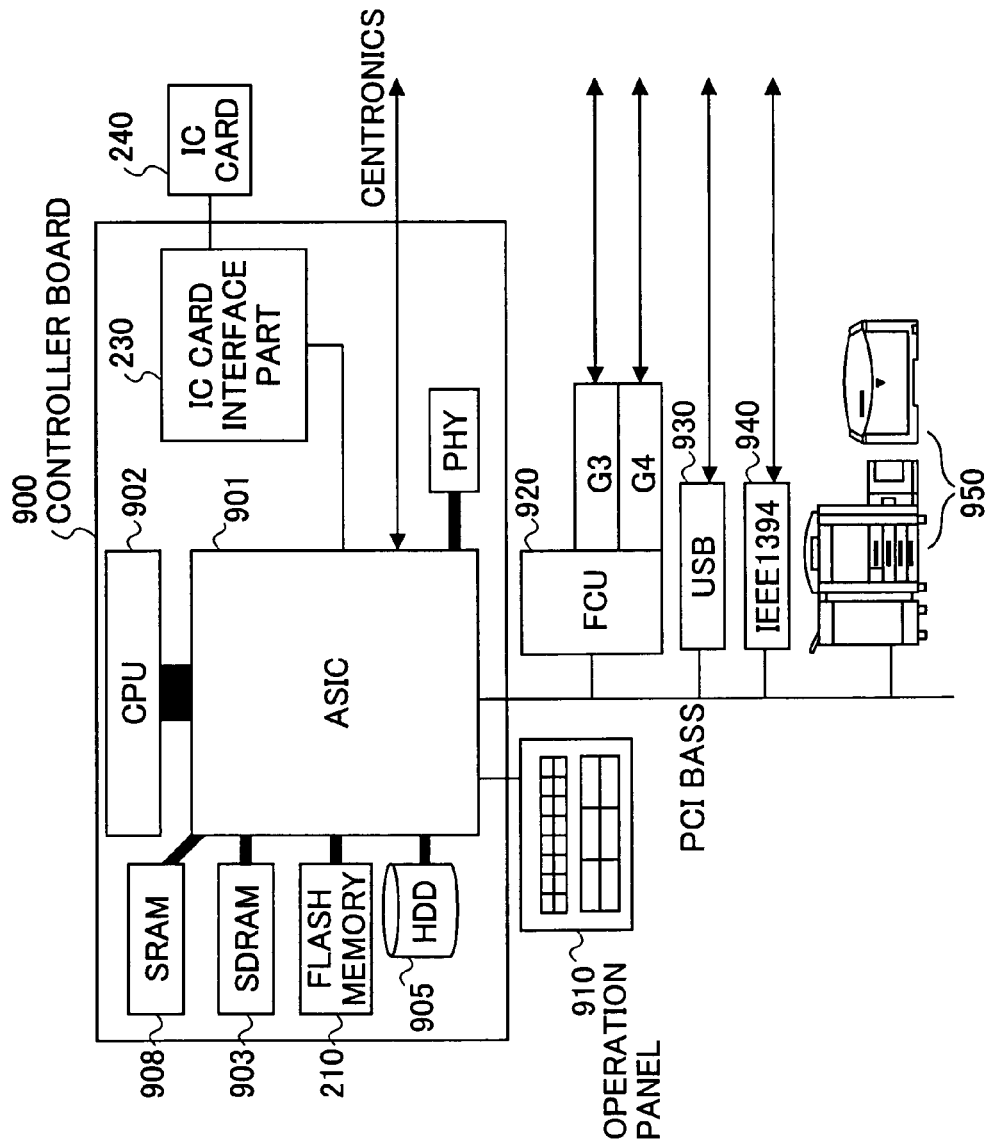
FIG. 9 is a hardware block diagram of the compound machine of the first embodiment.

Next, a hardware configuration of the compound machine 100 will be described. FIG. 9 is a hardware block diagram of the compound machine 100 of the first embodiment. As shown in FIG. 9, the compound machine includes a controller board 900, an operation panel 910, a fax control unit (FCU) 920, a USB 930, an IEEE1394 940, and a printer 950. The controller board 900 includes an ASIC 901 to which a CPU 902, a SDRAM 903, a SRAM 908, a flash memory (flash ROM) 210, an IC card interface part 230 and HDD 103 are connected. The operation panel 910 is directly connected to the ASIC 901. The FCU 920, the USB 930, the IEEE1394 940 and the printer 950 are connected to the ASIC 901 via a PCI bus.

As mentioned above, the flash memory 210 stores the launch selection data 211, the extension setting data 213, the external application presence or absence data 214 and the configuration file 212. In addition, the flash memory 210 stores programs of the general OS 121, control services and existing applications such as printer application 11 and the copy application 112 and the like.

The IC card 240 is inserted in the IC card interface part 230 through which the IC card 240 and the compound machine 100 exchange data. The IC card 240 can be used as a recording medium storing an external application to be launched from the IC card. The IC card can be also used as a recording medium for install. In this case, a developed external application is stored in the IC card 240, so that the installer 118 installs the external application from the IC card 240 to the HDD 103.

As mentioned above, according to the compound machine 100 of the first embodiment, the external application launch part 131 selects one of the HDD 103 or the IC card 240 or both of them as a location or as locations from which one or more applications are launched for the compound machine 100. In addition, according to the compound machine 100 of the first embodiment, the compound machine 100 can selects an medium in which an external application is stored. Thus, the external application can be easily launched, so that various functions realized by the external applications can be provided for the compound machine 100. In addition, necessary functions provided by the external applications can be realized without any problem even when the hardware resources such as memory capacity are limited.

Although the external application launch part is included in the compound machine as a program according to the above-mentioned embodiment, the external application launch part may be stored in an IC card, for example. Then, the external application launch part can be installed into the compound machine or launched from the IC card. In addition, the external application launch part may be stored in a computer connected to the compound machine via a network, so that the external application launch part can be installed in the compound machine or can be launched from the computer. These examples can be also adopted for other embodiments of the present invention.

Second Embodiment

In the compound machine 100 of the first embodiment, the HDD 103 or the IC card 240 is selected, or, both of the HDD 103 and the IC card 240 are selected by using the initial setting screen, and all applications installed in the selected mediums are launched. On the other hand, according to the compound machine 100 of the second embodiment, only necessary external applications can be selected from among the installed external applications.

A functional configuration, a hardware configuration and an external application launch part 131 according to the second embodiment are the same as those of the first embodiment.

In the compound machine 100 of the second embodiment, information of the extension setting data 213 stored in the flash memory 210 and launch processes by the external application launch part 131 are different from the first embodiment.

FIG. 10 is an example of the information of the extension setting data 213 of the compound machine 100 of the second embodiment. As shown in FIG. 10, the extension setting data 213 includes setting data indicating whether the external applications are launched or not (extension is used or not) in the same way as the first embodiment. In addition, the extension setting data 213 includes setting whether to launch or not to launch for each application. "Launch" or "not launch" for each external application is set via the initial setting screen that is displayed on the operation panel 910 only when the extension is set to be "launch". The setting of "Launch" or "not launch" for each external application is referred to from the external application launch part 131. An external application for which "launch" is set is launched, and an external application for which "not launch" is set is not launched.

Figure 11:
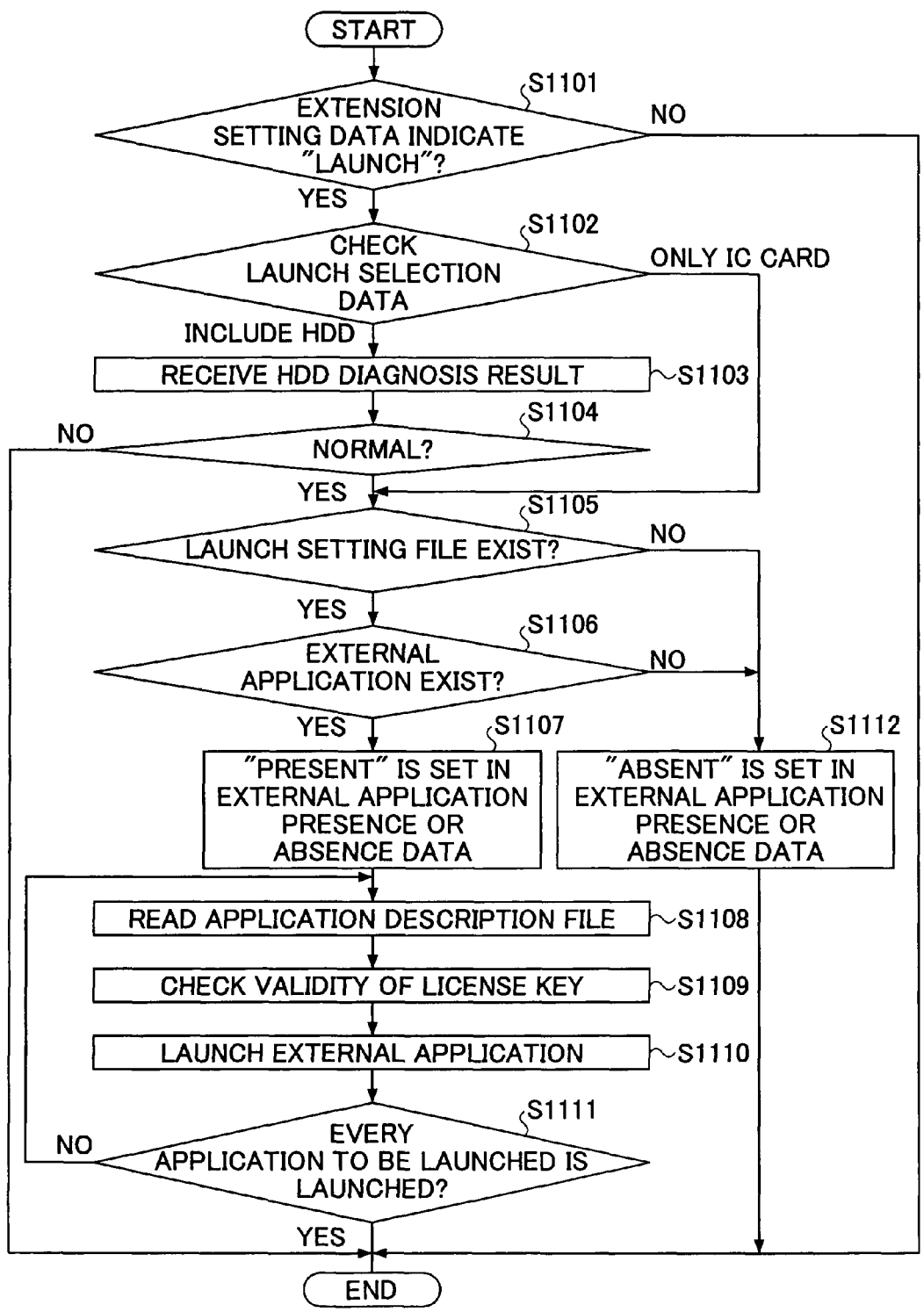
FIG. 11 is a flowchart showing the procedure for launching the external application according to the second embodiment.

Next, a launching process of the external application by the external application launch part will be described. FIG. 11 is a flowchart showing the procedure of the launching process of the external application.

Processes from determination whether the extension is used or not (step S1101) to determination of the validity of the license key (step S1109) are the same as those of the first embodiment (step S701-step S709).

If the license key is valid, the external application launch part 131 launches an external application from a medium indicated by the launch selection data 211 in step S1110. Then, processes from step S1108 to S1111 are repeated for each external application to which "launch" is set in the extension setting data 213. Accordingly, if the launch selection data 211 indicates "HDD" and "IC card", only external applications set in the extension setting data 213 are selected from among all external applications stored in the HDD 103 and the IC card 240.

Figure 12:
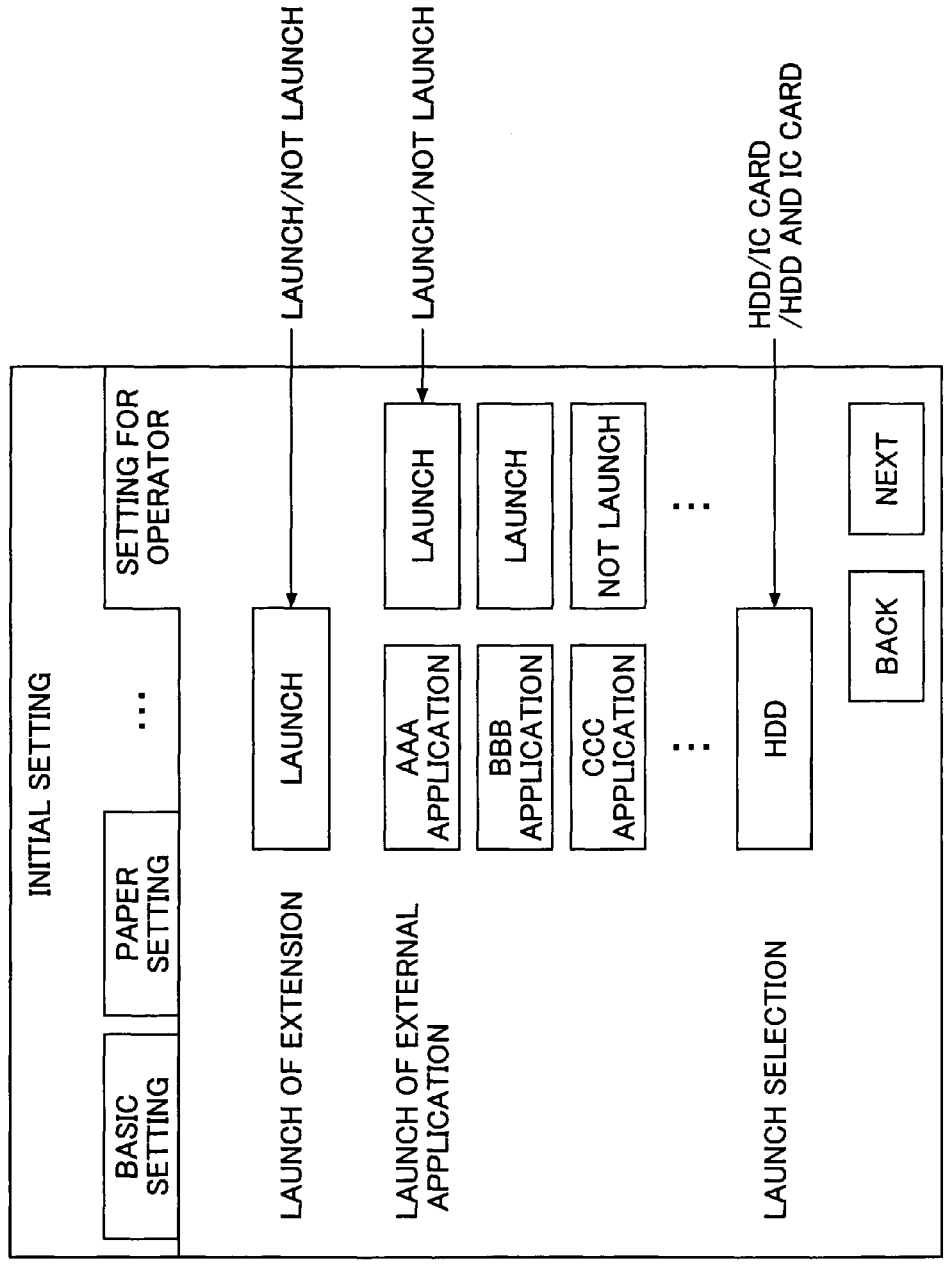
FIG. 12 shows information in the initial setting screen displayed on the operation panel according to the second embodiment.

The information indicating whether an external application is launched or not launched in the extension setting data 213 can be set from the operation panel. FIG. 12 shows information in the initial setting screen displayed on the operation panel 910. The initial setting screen includes a setting screen for operator. The setting screen for operator includes items of "launch of external application" in addition to items of "launch of extension" and "launch selection". In the item of "launch of external application", "launch" or "not launch" can be selected. If "launch" is selected, the SCS 122 sets "launch" in the extension setting data 213. If "not launch" is selected, the SCS 122 sets "not launch" in the extension setting data 213. Other items are set in the same way as the first embodiment.

In the setting screen shown in FIG. 2, for example, if "HDD" is selected as launch selection data, external applications stored in the HDD is shown in the item of "external application launch".

As mentioned above, according to the compound machine 100 of the second embodiment, only applications with which "launch" is associated are launched. Thus, if many external applications exists, only necessary functions can be executed, so that hardware resources such as memory capacity can be saved and process efficiency can be improved.

Third Embodiment

According to the compound machine 100 of the first and second embodiments, the external application is launched from the HDD 103 and/or the IC card 240. According to the third embodiment, an external application that is stored in a computer connected to a network can be launched, and one or more of the HDD 103, the IC card 240 and the network can be selected as a location from which an external application is launched.

Launch of an external application from a computer on a network according to the third embodiment may include steps for downloading the external application from the computer, storing the external application temporarily, and launching the external application. In addition, the launch may include steps for installing the external application from the computer and launching the external application.

The functional configuration and the hardware configuration of the compound machine 100 of the third embodiment are the same as those of the first and second embodiment. The configuration of the external application launch part, launch processes of the external application and the launch selection data in the flash memory 210 of the third embodiment is different from the compound machine 100 of the first embodiment.

Figure 13:
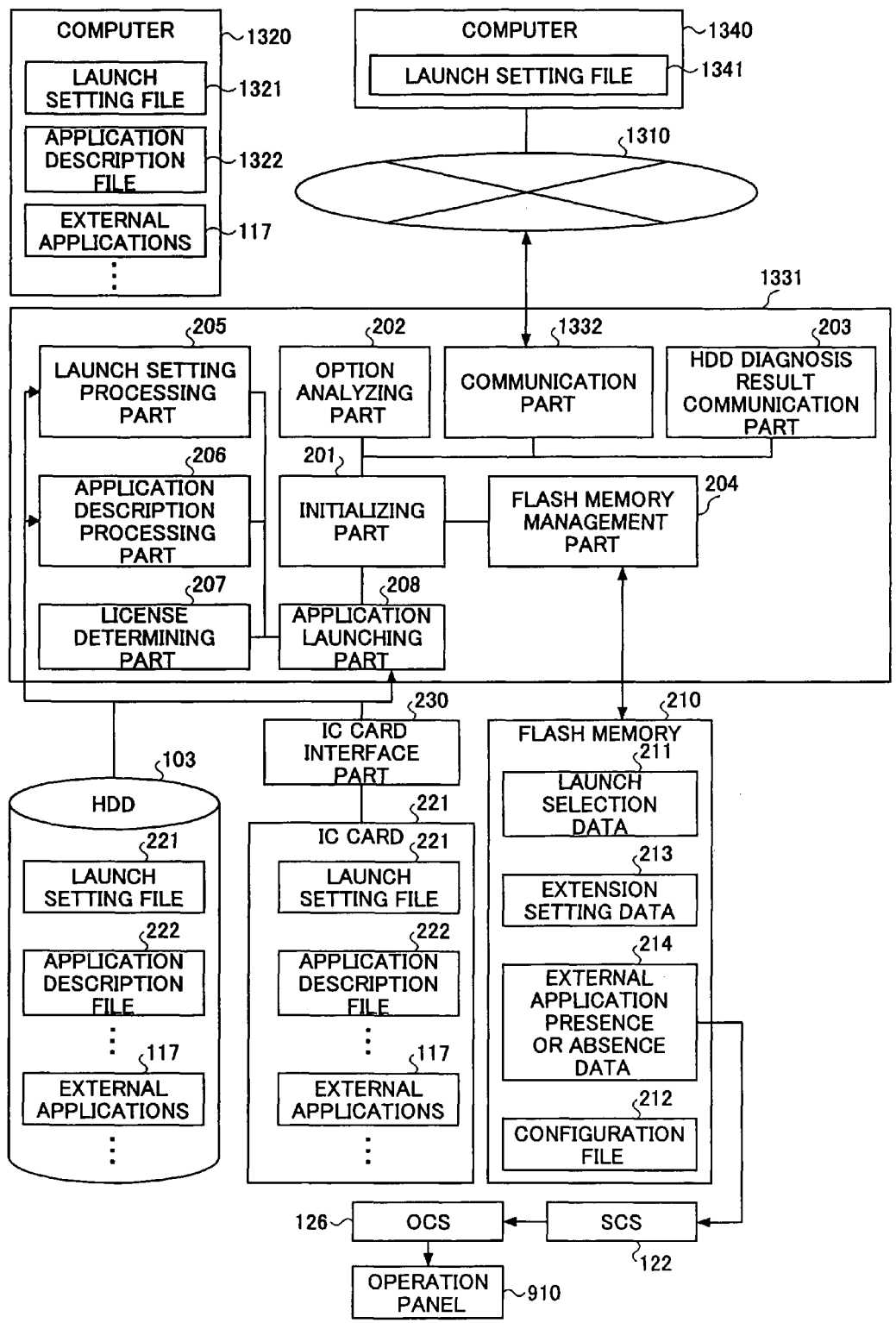
FIG. 13 is a block diagram showing functional configuration of the external application launching part of the compound machine of a third embodiment.

FIG. 13 is a block diagram showing functional configuration of the external application launch part 1331 of the compound machine 100 of the third embodiment. As shown in FIG. 13, the external application launch part 1331 includes an initializing part 201, an option analyzing part 202, a HDD diagnosis result communication part 203, a flash memory management part 204, a launch setting processing part 205, an application description processing part 206, a license determining part 207 and an application launching part 208 and a communication part 1332.

In the same way as the first embodiment, the IC card 240 and HDD 103 stores one or more external applications 117, launch setting files 221 and application description files 222.

The flash memory 210 includes a launch selection data 1351, an extension setting data 213, an external application presence or absence data 214, and a configuration file 212.

The compound machine 100 of this embodiment is connected to a network such as the Internet 1310 to which computers 1320 and 1340 are connected.

The computer 1320 stores a launch setting file 1321, one or more external application 117, and application description files corresponding to the external application in a storing area such as a hard disk. The computer 1340 stores a launch setting file 1341.

The communication part 332 of the external application launch part 1331 receives the launch setting file 1321 or 1341, the application description file 1322 and external applications from the computers 1320 and 1340 according to the http protocol or the ftp protocol.

Next, information in the launch setting files 1321 and 1341 will be described. FIG. 14 shows an example of the launch setting file 1321 or 1341.

The launch setting file basically includes a list of program names of the external applications 117 in the same way as the launch setting file in the HDD 103 and the IC card 240 in the first embodiment. According to the third embodiment, the launch setting file includes data described by http format as shown in FIG. 14 if the http protocol is used for communication between the compound machine and the computer. If ftp protocol is used, the launch setting file includes similar information as the first embodiment.

The program name includes URL of the application storing area of the computer 1320. The program name is unique in the computer 1320.

According to the present embodiment, the launch setting file can be stored in the computer 1320 that stores the external application. The launch setting file can be also stored in another computer 1340 instead of the computer 1340. If the launch setting file is stored in the computer 1340 that does not stores the external application, the program name needs to be written such that the program name indicates the URL of the computer 1320 that includes application storing area. In addition, the launch setting file can be also stored in the compound machine 100.

Next, the launch selection data 1351 according to the third embodiment will be described. FIG. 15 shows setting information of the launch selection data 1351. The launch selection data 1351 indicates a storing destination of the external application to be launched. As shown in FIG. 15, as the launch selection data 1351, "HDD", "IC card", "http" or "ftp" can be set, in addition, a plurality of items can be set among them. The launch selection data 211 is set via a initial setting screen displayed on the operation panel 910 and is referred to by the external application launch part 131.

If "HDD" is set as the launch selection data 1351, only an external application that is stored in the HDD 103 is launched. If "IC card" is set in the launch selection data 1351, only an external application that is stored in the IC card 240 is launched.

If the launch selection data 1351 indicates "http" or "ftp", the compound machine 100 receives one or more external applications stored in an application storing area on the Internet 1310, and launches the one or more external applications. If "http" is set, the application storing area is accessed by using the http protocol. If "ftp" is set, the application storing area is accessed by using the ftp protocol.

In addition, the launch selection data 1351 includes launch setting file addresses, in which one setting file address indicates an address for accessing by using the http protocol and another setting file address indicates an address for accessing by using the ftp protocol. The setting file addresses are also set by using the initial setting screen displayed on the operation panel 910, and the setting file addresses are referred to by the external application launch part 131.

That is, first, the external application launch part 131 refers to the launch setting file address (URL) in the launch selection data 1351. Then, the external application launch part 131 refers to the launch setting file 1321 or 1341, and receives the external application indicated by the launch setting file, and launches the external application.

The extension setting data 213 is the same as the first embodiment. In addition, same as the second embodiment, "launch" or "not launch" can be set for each external application.

Figure 16:
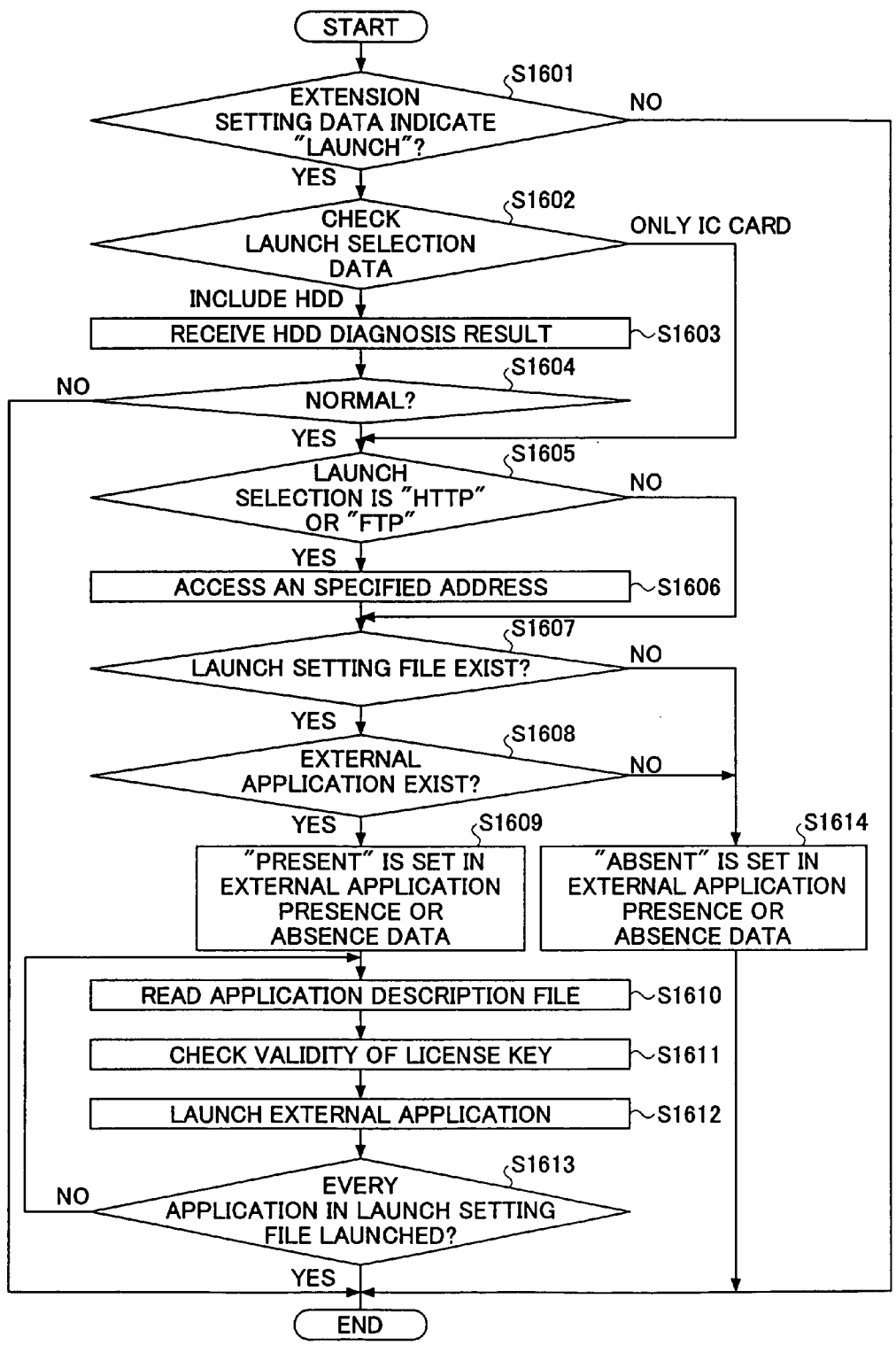
FIG. 16 is a flowchart showing the procedure for launching the external application according to the third embodiment.

Next, launch processes for the external application performed by the external application launch part 1331 will be described according to the third embodiment. FIG. 16 is a flowchart showing the procedure.

First, the external application launch part 1331 reads extension setting data 213 from the flash memory 210, and checks whether the extension setting data 213 indicates "launch" in step S1601. If the extension setting data 213 indicates "not launch" (No: step S1601), the process ends without launching the external application.

If the extension setting data 213 indicates "launch" (Yes: step S1601), the launch selection data 1351 is read from the flash memory 210, and checks setting information of the launch selection data 1351 to determine a medium or mediums from which the external application 117 is launched in step S1602. When the information of the launch selection data 1351 includes "HDD", that is, when the launch selection data 1351 is "HDD" or "HDD and IC card", the external application launch part 1331 enters a wait state for diagnosing result by the HDD diagnosing part 132.

When the external application launch part 1331 receives the diagnosing result from the HDD diagnosing part 132 in step S1603, the external application launch part 1331 determines whether the result indicates normal or abnormal in step S1604. If the result indicates abnormal (No: step S1604), an error message is displayed on a display part of the operation panel 910 and the external application 117 is not launched.

When the result indicates normal (Yes: step S1604), the external application launch part 1331 checks whether the launch selection data 1351 includes "http" or "ftp" in step S1605. If the launch selection data 1351 includes "http" or "ftp", the external application launch part 1331 accesses the launch setting file address indicated in the launch selection data 1351 in step S1606. If "http" is set in the launch selection data 1351, the http protocol is used. If "ftp" is set in the launch selection data 1351, the ftp protocol is used.

The external application launch part 1331 checks whether the launch setting file exists in a medium indicated by the launch selection data 1351 in step S1607 to determine if the external application exists.

That is, if the application is to be launched from the HDD 103 according to the setting of the launch selection data 1351, the external application launch part 131 checks whether the launch setting file 221 exists in the HDD 103. If the external application is to be launched from the IC card 240 according to the setting of the launch selection data 1351, the external application launch part 131 checks whether the launch setting file 221 exists in the IC card 240. If the setting of the launch selection data is "http" or "ftp", the compound machine 100 checks whether the launch setting exists in the address accesses in step s1606.

When the launch setting file does not exists (No in step S1607), the external application launch part 1331 determines that the external application is not installed in the medium, so that "absence" is set in the external application presence or absence data 214 in step S1614.

When the launch setting file exists (Yes in step S1607), the external application launch part 1331 further checks whether the launch setting file includes a program name of an external application in step S1608. If the launch setting file does not include the program name of the external application (No in step S1608), the external application launch part 1331 determines that the external application is not installed in the location, so that the external application launch part 1331 sets "absence" in the external application presence or absence data 214 in step S1614.

If the launch setting file includes the program name of the external application (Yes in step S1608), the external application launch part 1331 determines that the external application is installed, so that "presence" is set in the external application presence or absence data 214 in step S1609.

Next, the external application launch part 1331 reads the application description file 222 of the external application 117 from the location indicated by the launch selection data 1351 in step S1610. Then, the external application launch part 1331 determines validity of the license key in the application description file 222 to determine whether the license key is expired, or abnormal or the like in step S1611. At this time, if it is determined that the license key is invalid, the external application 117 is not launched, and an message indicating the license key is invalid is displayed on the operation panel 910.

When the license key is valid, the external application launch part 1331 launches the external application from the location indicated by the launch selection data in step S1612.

At this time, if "http" or "ftp" is set in the launch selection data 1351, the compound machine 100 temporarily downloads the external application from the application storing area indicated by the launch setting file 1321 or 1341, and launches the downloaded external application. Then, the processes from the step S1610 to step S1612 are repeated for every external application set in the launch setting file in step S1613.

When launching a plurality of external applications in the application storing area on the Internet 1310, if the external applications are downloaded one by one as required, efficiency of commutation is not good. Thus, it is desirable that all external applications indicated by the launch setting file 1321 or 1341 are downloaded at the time when accessing the application storing area for the first time.

Accordingly, as shown in FIG. 2, all external applications that are installed in specified locations are launched to be executed on the application layer.

Figure 17:
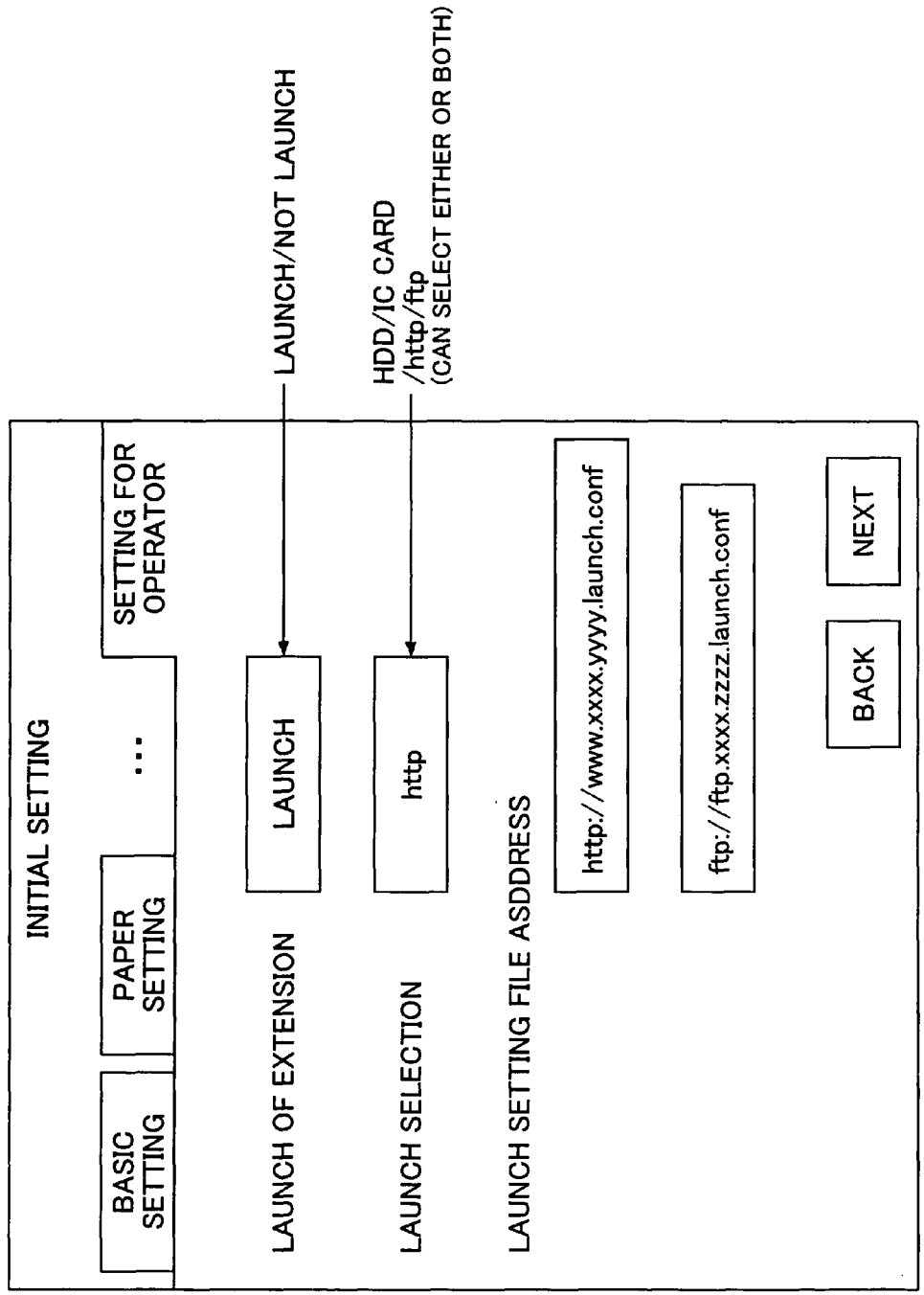
FIG. 17 shows an initial setting screen according to the third embodiment.

Also in the third embodiment, information in the launch selection data can be set from the operation panel 910 of the compound machine 100. FIG. 17 shows the initial setting screen. In the same way as the first embodiment, the initial setting screen is displayed by calling drawing functions of the function library of the OCS 126 by the SCS 122. At this time, as shown in FIG. 17, the SCS 122 refers to the external application presence or absence data 214 in the flash memory 210. When the external application presence or absence data 214 indicates "present", that is, when the external application is installed in a location specified by the launch selection data, items of "launch of extension", "launch selection" and "launch setting file address" appears in the setting screen for operator in the initial setting screen as shown in FIG. 17. The item of "launch of extension" is the same as that of the first embodiment.

The item of "launch selection" corresponds to the launch selection in the launch selection data 1351. As the "launch selection", one or more can be selected from among "HDD", "IC card", "http" and "ftp". The selected information is set in the launch selection data 1351 by the SCS 122.

In the item of "launch setting file address", an address of the launch setting file 1321 or 1341 is specified. The address is specified for both of the cases using the http protocol and using the ftp protocol. The setting information is also set in the launch selection data 1351 by the SCS 122.

As mentioned above, according to the compound machine 100 of the third embodiment, the external application launch part 1331 selects one or more locations from among the location on the Internet, HDD 103 and the IC card 240, and launches one or more applications from the selected locations. Accordingly, even when the external application exists in a location on the Internet, the application can be easily launched, so that various functions can be provided to the compound machine 100.

Although external application is stored only in the computer 1320 according to the third embodiment, external applications to be launched by the compound machine 100 can be stored more computers on the Internet. In this case, a plurality of addresses of launch setting files may be set in the launch selection data 1351, or, a plurality of addresses of storing areas of the applications can be set in an launch setting file.

In addition, the compound machine 100 downloads an external application from a location on the Internet every time when the external application is required according to the third embodiment. Instead of this method, the compound machine 100 may download and install an external application when the compound machine access the external application for the first time, so that the external application can be launched from the HDD 103 from the next launch.

Fourth Embodiment

In the first to third embodiments, the external application launch part 131 is provided in the compound machine 100 as shown in FIG. 1. In the fourth embodiment, a VAS (virtual application service) includes the external application launch part 131 as shown in FIG. 18.

Figure 18:
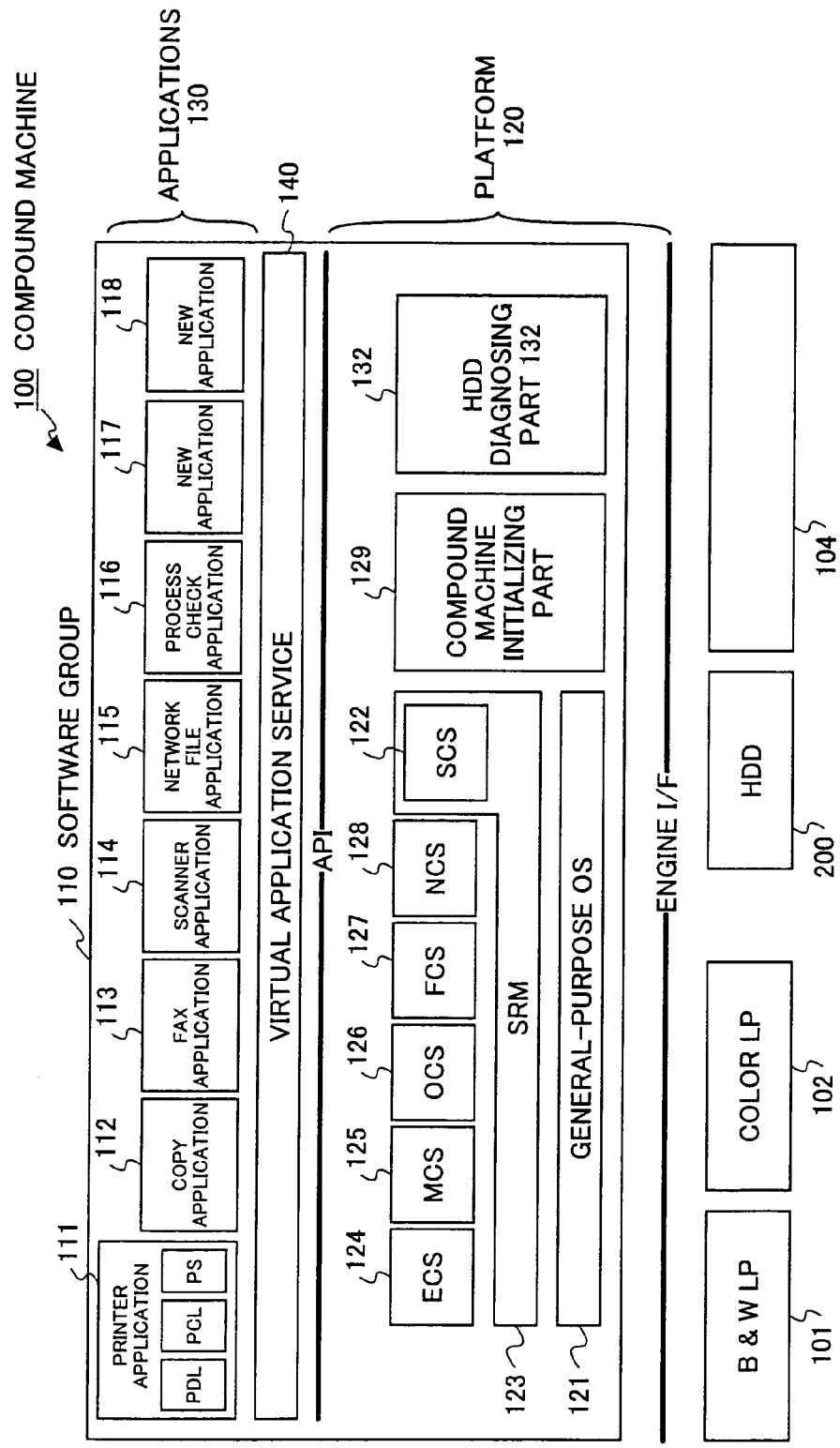
FIG. 18 is a block diagram of the compound machine according to a fourth embodiment.

As shown in FIG. 18, the VAS 140 is provided between applications and control services. The VAS 140 is a software module that operates as a server process for applications and operates as a client process for control services. The VAS 140 includes, for example, capabilities for absorbing version differences between APIs used by an application and APIs provided by a control service, and for hiding predetermined functions of control services against applications.

According to the fourth embodiment, the functions of the external application launch part 131 are included in the VAS 140, so that the VAS 140 can launch external applications by referring to the launch setting file and the like in the same way as performed by the external application launch part 131. In addition, the VAS 140 has a capability for performing launch control. In the launch control, the VAS 140 tentatively launch an application, and obtains information on the application (such as resources used by the application) from the application, and determines whether the application can be executed on the compound machine 100. The tentative launch is to launch the application only for obtaining the information on the application by using interprocess communication between the application and the VAS 140. The application can be developed such that the tentative launch is available, and the application is tentatively launched when the VAS instruct tentative launch by using a parameter.

Although the launch selection data and the extension setting data are produced by using the initial setting screen displayed by the SCS 122 in the first to third embodiment, the VAS 140 can display a setting screen for setting the launch selection data and the extension setting data and the like, and produces the launch selection data and the extension setting data and the like according to the fourth embodiment.

The VAS 140 is launched, for example, by the compound machine initializing part 129. In addition, the VAS 140 can be stored in a location (IC card, a server on a network, or the like) outside of the compound machine 100, so that the VAS 140 can be launched from the location.

As mentioned above, according to the present invention, an image forming apparatus that includes service modules for performing system side processes on image formation is provided, wherein applications can be added to the image forming apparatus separately from the service modules. The image forming apparatus includes an application launch part for referring to launch selection information indicating at least a location that stores one or more applications, and launching the one or more applications from the at least a location according to the launch selection information.

According to this invention, when applications are stored in various locations, the image forming apparatus can select one or more locations and launch applications from the one or more locations. Thus, an image forming apparatus that can provide various capabilities can be provided in which launch of applications can be performed selectively.

In the image forming apparatus, the at least a location may be at least one of a hard disk device, a recording medium removable from the image forming apparatus, a computer connected to the image forming apparatus via a network.

The image forming apparatus may further includes: a part for displaying a setting screen for setting the launch selection information on a display part of the image forming apparatus, and storing information input from the setting screen as the launch selection information.

Accordingly, the user can select a location from which an application is launched, so that the image forming apparatus can provide various capabilities flexibly.

In the image forming apparatus, the application launch part may launch the application by referring to information on the application.

The information on the application may be a name or address information of an application that is stored in the location storing the application. According to this invention, required applications can be launched with reliability.

In image forming apparatus, the application launch part determines whether the application is installed at the location according to presence or absence of predetermined information on the application, and the application launch part launches the application if the application is installed at the location.

Accordingly, the image forming apparatus can automatically know installed applications and can launch the installed applications. The above-mentioned information may be stored in any location, for example, in a location same as the application or in a location separate from the location storing the application.

In the image forming apparatus, the application launch part may refer to setting information including information indicating whether a predetermined application is to be launched, and the application launch part launches the predetermined application if the setting information includes information indicating the predetermined application is to be launched. The predetermined application may be an external application, for example.

According to this image forming apparatus, even when the predetermined applications exist, if extensions of the image forming apparatus provided by the predetermined applications are not used by the user, the image forming apparatus does not launch the predetermined applications, and the image forming apparatus launches only preinstalled applications. Thus, resources of the image forming apparatus can be saved and efficiency improves.

In the image forming apparatus, the application launch part may refer to setting information including information indicating applications to be launched, and the application launch part launches the application indicated in the information.

Thus, even when many applications are stored in various locations, only necessary applications can be launched, so that resources of the image forming apparatus can be saved and efficiency improves.

In addition, the image forming apparatus further includes: a part for displaying a setting screen for setting the setting information on a display part of the image forming apparatus, and storing information input from the setting screen as the setting information. Accordingly, the user can specify necessary applications.

The image forming apparatus may includes a virtual application service that operates as a client process for the services modules and operates as a server process for the applications, and the virtual application service includes the application launch part. Accordingly, the virtual application service can launch various applications according to the launch selection information.

The above-mentioned image forming apparatus may receive an application from the computer connected to the image forming apparatus via a network by using a http protocol or a ftp protocol, and the application launch part launches the received application. Accordingly, the image forming apparatus receives an application on the network by using an general network protocol such as the http protocol or the ftp protocol. Thus, the program for receiving the application can be developed easily.

The present invention is not limited to the specifically disclosed embodiments, and variations and modifications may be made without departing from the scope of the present invention.

What is claimed is:

1. An image forming apparatus to which applications can be added, the image forming apparatus comprising:
    a controller board including a central processing unit and configured to execute:
    an auxiliary storage interface part configured to interface with one or more auxiliary storage devices that store one or more applications, such that the one or more applications are installed on the one or more auxiliary storage devices;
    a part configured to display a setting screen that receives launch selection information from a display part of the image forming apparatus, and to store information input via the setting screen as launch selection information, the launch selection information at least identifying a selection of the auxiliary storage device from among a plurality of kinds of the one or more auxiliary storage devices;
    a determining part configured to access the launch selection information in order to select the one or more auxiliary storage devices from which the one or more applications should be launched from among the plurality of kinds of the auxiliary storage devices, and to review the operation status of the selected one or more auxiliary storage devices; and
    an application launch part configured to launch the one or more applications from a single auxiliary storage device when a validity of license keys respectively corresponding to the one or more applications are confirmed and when the determining part selects the single auxiliary storage device and the operation status of the single auxiliary storage device is normal, and to launch the applications from a plurality of auxiliary storage devices when a validity of license keys respectively corresponding to the applications are confirmed and when the determining part selects the plurality of auxiliary storage devices and the respective operation statuses of the plurality of auxiliary storage devices are normal, the one or more auxiliary storage devices being at least one of a storage inside the image forming apparatus, a recording medium removable from the image forming apparatus without dissembling any other portion of the image forming apparatus, and a computer connected to the image forming apparatus via a network.

2. The image forming apparatus as claimed in claim 1, wherein the application launch part launches the application by referring to information on the application.

3. The image forming apparatus as claimed in claim 2, wherein the information referred to by the application launch part is address information of the application.

4. The image forming apparatus as claimed in claim 1, wherein the application launch part determines whether the application is installed at the location according to presence or absence of predetermined information on the application, and the application launch part launches the application if the application is installed at the location.

5. The image forming apparatus as claimed in claim 1, wherein the application launch part refers to setting information including information indicating whether a predetermined application is to be launched, and the application launch part launches the predetermined application if the setting information includes information indicating the predetermined application is to be launched.

6. The image forming apparatus as claimed in claim 1, wherein the application launch part refers to setting information including information indicating applications to be launched, and the application launch part launches the application indicated in the information.

7. The image forming apparatus as claimed in claim 6, the image forming apparatus further comprising:
    a part for displaying a setting screen for setting the setting information on a display part of the image forming apparatus, and storing information input from the setting screen as the setting information.

8. The image forming apparatus as claimed in claim 1, the image forming apparatus further comprising a virtual application service that operates as a client process for services modules and operates as a server process for the applications, wherein the virtual application service includes the application launch part.

9. The image forming apparatus as claimed in claim 1, wherein the image forming apparatus receives an application from the computer connected to the image forming apparatus via a network by using a http protocol or a ftp protocol, and the application launch part launches the received application.

10. A non-transitory computer readable medium storing program code for causing an image forming apparatus to execute of method of launching an application, wherein applications can be added to the image forming apparatus, comprising:

storing, in one or more auxiliary storage devices, one or more applications such that the one or more applications are installed on the one or more auxiliary storage devices;

displaying a setting screen that receives launch selection information from a display part of the image forming apparatus;

storing information input via the setting screen as launch selection information, the launch selection information at least identifying a selection of the one or more auxiliary storage devices from among a plurality of kinds of the one or more auxiliary storage devices;

accessing the launch selection information in order to select the one or more auxiliary storage devices from which the one or more applications should be launched from among the plurality of kinds of the auxiliary storage devices, and reviewing the operation status of the selected one or more auxiliary storage devices; and launching the one or more applications from a single auxiliary storage device when a validity of license keys respectively corresponding to the one or more applications are confirmed and when the accessing selects the single auxiliary storage device and the operation status of the single auxiliary storage device is normal, and launching the applications from a plurality of auxiliary storage devices when a validity of license keys respectively corresponding to the applications are confirmed and when the accessing selects the plurality of auxiliary storage devices and the respective operation statuses of the plurality of auxiliary storage devices are normal, the one or more auxiliary storage devices being at least one of a storage inside the image forming apparatus, a recording medium removable from the image forming apparatus without dissembling any other portion of the image forming apparatus, and a computer connected to the image forming apparatus via a network.

11. The non-transitory computer readable medium as claimed in claim 10, wherein the launching launches the application by referring to information on the application.

12. The non-transitory computer readable medium as claimed in claim 11, wherein the information referred to by the launching is address information of the application.

13. The non-transitory computer readable medium as claimed in claim 10, wherein the launching determines whether the application is installed at the location according to presence or absence of predetermined information on the application, and the launching launches the application if the application is installed at the location.

14. The non-transitory computer readable medium as claimed in claim 10, wherein the launching refers to setting information including information indicating whether a predetermined application is to be launched, and the launching launches the predetermined application if the setting information includes information indicating the predetermined application is to be launched.

15. The non-transitory computer readable medium as claimed in claim 10, wherein the launching refers to setting information including information indicating applications to be launched, and the launching launches the application indicated in the information.

16. The non-transitory computer readable medium as claimed in claim 10, wherein the launching receives an application from the computer connected to the image forming apparatus via a network by using a http protocol or a ftp protocol, and launches the received application.

17. An image forming apparatus to which applications can be added, the image forming apparatus comprising:

a controller board including a central processing unit and configured to execute:

an auxiliary storage interface part configured to interface with one or more auxiliary storage devices that store one or more applications such that the one or more applications are installed on the one or more auxiliary storage devices, the auxiliary storage device corresponding to a recording medium removable from the image forming apparatus without disassembling any other portion of the image forming apparatus;

a part configured to display a setting screen that receives launch selection information from a display part of the image forming apparatus, and to store information input via the setting screen as launch selection information, the launch selection information identifying a location of at least the one or more auxiliary storage devices;

a determining part configured to access the launch selection information in order to select the one or more auxiliary storage devices from which the one or more applications should be launched from among the auxiliary storage devices, and to review the operation status of the selected one or more auxiliary storage devices; and an application launch part configured to launch the one or more applications from a single auxiliary storage device when a validity of license keys respectively corresponding to the one or more applications are confirmed and when the determining part selects the single auxiliary storage device and the operation status of the single auxiliary storage device is normal, and to launch the applications from a plurality of auxiliary storage devices when a validity of license keys respectively corresponding to the one or more applications are confirmed and when the determining part selects the plurality of auxiliary storage devices and the respective operation statuses of the plurality of auxiliary storage devices are normal, the one or more auxiliary storage devices being at least one of a storage inside the image forming apparatus, a recording medium removable from the image forming apparatus without dissembling any other portion of the image forming apparatus, and a computer connected to the image forming apparatus via a network.

* * * * *